Jan. 16, 1934. P. N. SNELL, JR 1,943,699
DRILL
Filed Dec. 10, 1929
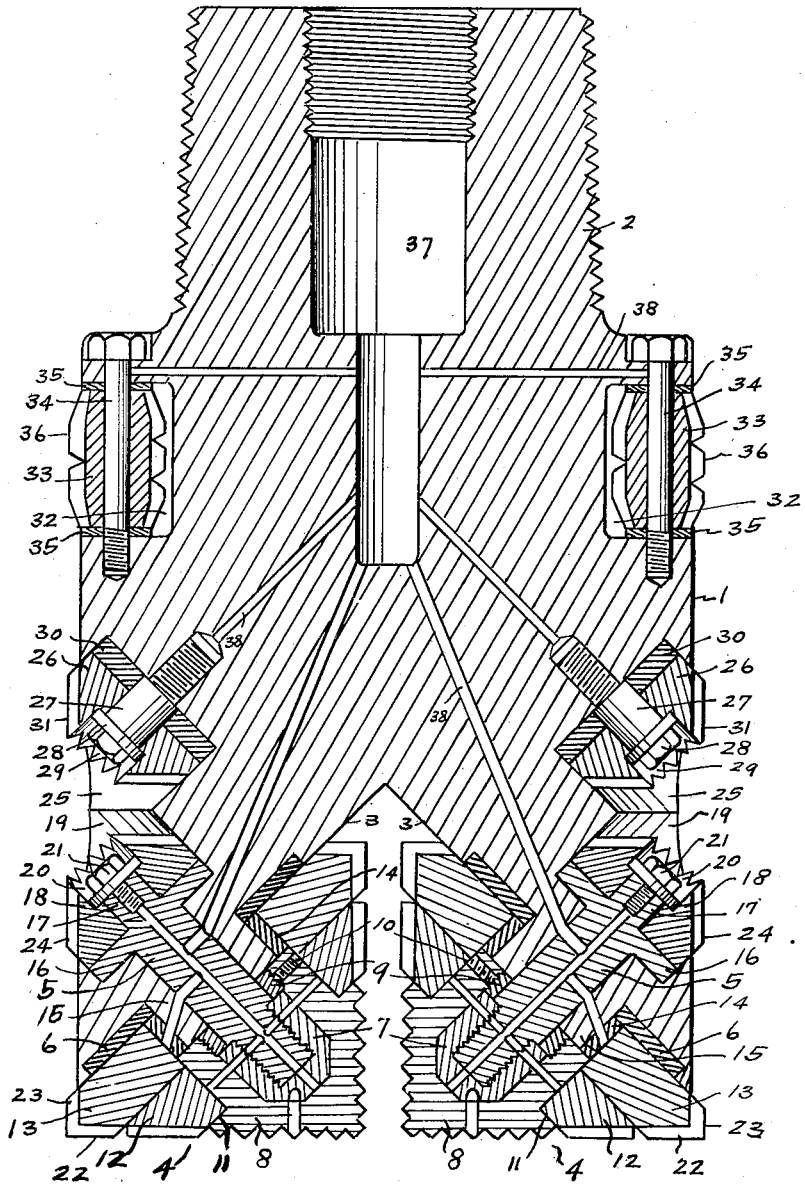
Inventor
Philip N. Snell Jr.
By Hardway Tather
Attorneys Patented Jan. 16, 1934

1,943,699

UNITED STATES PATENT OFFICE 1,943,699

DRILL

Philip N. Snell, Jr., Houston, Tex., assignor, by direct and mesne assignments, of three-eighths to A. H. Snell and one-eighth to Conrad J. Landram, both of Houston, Tex.

Application December 10, 1929
Serial No. 412,961

3 Claims. (Cl. 255—71)

This invention relates to new and useful improvements in a drill.

One object of the invention is to provide a drill of the character described specially designed for use in drilling deep wells, particularly where rock or other hard formation is encountered.

Another object of the invention is to provide a drill having a solid head provided with diverging bearing faces at its lower end and sectional, frusto-conical cutters mounted in a novel manner to bear against said bearing faces, said head also having reaming cutters of novel formation mounted therein and provided to ream the sides of the bore as drilling progresses.

A further feature of the invention resides in the provision of a drill having boring cutters mounted in the head thereof, and provided with novel means for lubricating said cutters.

With the above and other objects in view, the invention has particular relation to certain novel features of construction, operation and arrangement of parts, an example of which is given in this specification and illustrated in the accompanying drawing wherein the figure shows a vertical sectional view of the drill.

In the drawing the numeral 1 designates a solid drill head whose upper end is reduced and forms an outwardly threaded shank 2 to receive the drill collar by means of which the drill may be attached to the lower end of the drilling stem.

The lower end of the head is formed with the downwardly diverging bearing faces 3, 3 against which the frusto-conical cutters designated generally by the numerals 4, 4, bear. These cutters are mounted on the lower ends of the spindles 5, 5, which converge downwardly through the head. Counter sunk into the faces 3, 3 are the respective bearing plates 6, 6 against which the cutters 4, 4, work. Threaded onto the lower end of each spindle 5 there is a bushing 7, and working over each bushing 7, as a bearing, there is the cutter section 8, forming the apex of the corresponding cutter 4. This section 8 is retained on the spindle by an annular lock nut 9 which is threaded into the section 8 and which abuts the adjacent end of the corresponding bushing 7 and which is retained in place by a set screw 10. The cutter section 8 has its inner end reduced to form the annular external shoulder 11 and around this reduced end the intermediate annular cutter section 12 rotates. Between the cutter section 12 and the bearing washer 6, there is the annular section 13 which has the internal bearing sleeve 14 interposed between it and the reduced portion 15 projecting inwardly from the corresponding face 3 and through which the corresponding spindle 5 works. The outer end of each spindle 5 has an annular bearing rib 16 formed integral therewith and extending outwardly beyond said rib and integral therewith is a reduced portion forming a reamer spindle 17 on which the side reamer 18 is mounted to rotate. The bearing rib 16 and the corresponding reamer 18 are located in a side recess 19 of the head 1 and the apex of each side reamer 18 has a socket 20 wherein is located a set screw 21 which is screwed into the corresponding reamer spindle 17 and which has an enlarged head to retain the corresponding reaming cutter 18 against detachment. The boring cutters 4 have suitable peripheral teeth 22, which operate against the bottom of the bore as well as the side reaming teeth 23 which ream out the bore as drilling progresses. The side reaming cutters 18 are each mounted to rotate about upwardly diverging axes and have the side reaming teeth 24 which work against the sides of the bore as the drill rotates.

Above the recess 19 the head has the reaming cutter recesses 25 in which are located reaming cutters 26. These cutters 26 are mounted on the downwardly diverging spindles 27 having the enlarged heads 28 located in sockets 29 in the apexes of said cutters, and by means of which the cutters are retained in place. The spindles 27 are screwed into the head 1 as shown, and between the head and the cutters 26 and surrounding the spindles 27 are the bearing washers 30.

The cutters 26 have the external teeth 31 which operate against and ream the sides of the bore.

It is to be noted that the cutters 18, 26, are substantially frusto-conical in form and are so disposed that the teeth, as they come into working relation with the walls of the bore, will assume a substantially vertical position.

In the upper end of the head are the side pockets 32, 32, in which are located the sectional side reamers 33, 33 which rotate on substantially vertical axes and these side reamers 33 operate on the vertical spindles 34, 34 which are anchored to the head and which extend through axial bearings in said side reamers 33. Between the ends of the side reamers 33 and the ends of the pockets 32 are the bearing washers 35 through which the spindles 34 extend. The sections of the side reamers 33 have the peripherial reaming teeth 36 thereon. In the shank 2 there is a chamber 37 whose upper end is internally threaded to receive a suitable lubricant container. From the chamber 37 through the head, lead the lubricant ducts as 38 which continue on through lubricant channels in the spindles 5, 17, 27 and 34 to the bearings of the respective cutters mounted on said spindles through which the operative parts of the drill may be supplied with a suitable lubricant.

The drawing and description disclose what is now considered to be a preferred form of the invention, by way of illustration only while the broad principle of the invention will be defined by the appended claims:

What I claim is:

1. A drill comprising a head having a lower end face provided with a reduced extension, a spindle arranged axially with respect to said extension, a bushing on the lower end of the spindle, a conical cutter retained on said spindle and formed of sections, one of said sections being rotatable on the end of the spindle and enclosing said bushing and having an external abutment, a lock nut on said section engaging said bushing and retaining said section on the spindle and the other sections of the cutter being assembled to rotate about the axis of the spindle and being mounted between said abutment and end face, the end section of the cutter being reduced and fitting into the adjacent section.

2. A drill comprising a head having a lower end face, a spindle on the head extending therefrom at approximately right angles to said face whose lower end is provided with a retainer, an approximately conical rotatable cutter retained on said spindle and formed of sections, one of said sections being rotatable on the end of the spindle and having an external abutment, and also having an interlocking connection with the spindle and the other sections of said cutter being assembled to rotate about the axis of the spindle and being mounted between and retained in position by said abutment and face the section on the end of the spindle having a reduced portion which rotates within the adjacent section.

3. A drill comprising a head having a lower end face, provided with a reduced extension, a spindle arranged axially with respect to said extension, a bushing on the lower ends of the spindle, a conical cutter retained on the spindle and formed of sections, one of said sections being rotatable on the end of the spindle and enclosing said bushing and having an external abutment, a lock nut on said section engaging said bushing and retaining said end section on the spindle, the other sections of the cutter being assembled to rotate about the axis of the spindle and being mounted between said abutment and end face, the section of the cutter mounted on the end of the spindle having a reduced portion forming a bearing around which the other sections rotate.

PHILIP N. SNELL, Jr.